(12) United States Patent
Powers et al.

(10) Patent No.: US 8,775,113 B2
(45) Date of Patent: Jul. 8, 2014

(54) AUTOMATED PORTABLE MEDIA DEVICE TESTING SYSTEM

(75) Inventors: David M. Powers, Morgan Hill, CA (US); Christian Huffman, San Jose, CA (US); Daniel A. West, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1116 days.

(21) Appl. No.: 12/238,435

(22) Filed: Sep. 26, 2008

(65) Prior Publication Data

US 2009/0192752 A1   Jul. 30, 2009

Related U.S. Application Data

(60) Provisional application No. 61/024,517, filed on Jan. 29, 2008.

(51) Int. Cl.
*G06F 19/00* (2011.01)
*G06F 11/00* (2006.01)

(52) U.S. Cl.
USPC ............................................ 702/117; 714/25

(58) Field of Classification Search
USPC ................. 702/117; 703/22; 714/37, 38.1
See application file for complete search history.

(56) References Cited

U.S. PATENT DOCUMENTS

| | | | |
|---|---|---|---|
| 4,328,514 A * | 5/1982 | Nakashima et al. | ........ 348/635 |
| 4,673,861 A | 6/1987 | Dubovsky et al. | |
| 5,150,031 A | 9/1992 | James et al. | |
| 5,471,128 A | 11/1995 | Patino et al. | |
| 5,586,893 A | 12/1996 | Mosquera | |
| 5,648,712 A | 7/1997 | Hahn | |
| 5,732,361 A | 3/1998 | Liu | |
| 5,754,027 A | 5/1998 | Oglesbee et al. | |
| 5,845,217 A | 12/1998 | Lindell et al. | |
| 6,130,518 A | 10/2000 | Gabehart et al. | |
| 6,184,652 B1 | 2/2001 | Yang | |
| 6,184,655 B1 | 2/2001 | Malackowski | |
| 6,188,265 B1 | 2/2001 | Liu et al. | |
| 6,204,637 B1 | 3/2001 | Rengan | |
| 6,211,649 B1 | 4/2001 | Matsuda | |
| 6,256,252 B1 * | 7/2001 | Arimoto | ........ 365/227 |

(Continued)

FOREIGN PATENT DOCUMENTS

| | | |
|---|---|---|
| JP | 2002-374447 A | 12/2002 |
| JP | 2003-032351 A | 1/2003 |
| JP | 2003-274386 A | 9/2003 |
| WO | WO 03-036541 A1 | 5/2003 |

*Primary Examiner* — Michael Nghiem
*Assistant Examiner* — Alexander Satanovsky
(74) *Attorney, Agent, or Firm* — Kilpatrick Townsend & Stockton LLP

(57) ABSTRACT

Circuits, methods, and apparatus for testing media devices. One example provides a test system for testing a number of media players. One or more computers can control the testing of the media players and collect results. Each media player tested may be connected to a computer via an adapter. The adapter may include a connection control circuit and an interface. The connection control circuit may connect and disconnect a power supply to the media player being tested. The voltage waveform produced when the power supply is connected and disconnected may be designed to mimic the voltage waveform produced when a user connects and disconnects a cable or docking station from the media player. The interface may receive commands to provide specific instructions to the media player. The interface may monitor the status and activities performed by the media player and report back to the computer.

15 Claims, 10 Drawing Sheets

(56) References Cited

U.S. PATENT DOCUMENTS

| | | |
|---|---|---|
| 6,344,727 B1 | 2/2002 | Desai et al. |
| 6,489,751 B2 | 12/2002 | Small et al. |
| 6,608,399 B2 | 8/2003 | McConnell et al. |
| 6,775,733 B2 * | 8/2004 | Chang et al. ............... 710/313 |
| 7,213,067 B2 * | 5/2007 | Maeda ........................ 709/224 |
| 7,783,799 B1 * | 8/2010 | Sivertsen .................... 710/62 |
| 2002/0132651 A1 | 9/2002 | Jinnouchi |
| 2002/0156949 A1 | 10/2002 | Kubo et al. |
| 2006/0080104 A1 * | 4/2006 | Dang ........................ 704/270 |
| 2006/0085653 A1 * | 4/2006 | Bollinger et al. ............ 713/300 |
| 2008/0133974 A1 * | 6/2008 | Kogan et al. ................ 714/38 |
| 2008/0256394 A1 * | 10/2008 | Rashevsky et al. .......... 714/38 |
| 2010/0017288 A1 * | 1/2010 | Graham et al. ............ 705/14.45 |
| 2010/0161091 A1 * | 6/2010 | Takatsuka ................... 700/94 |

* cited by examiner

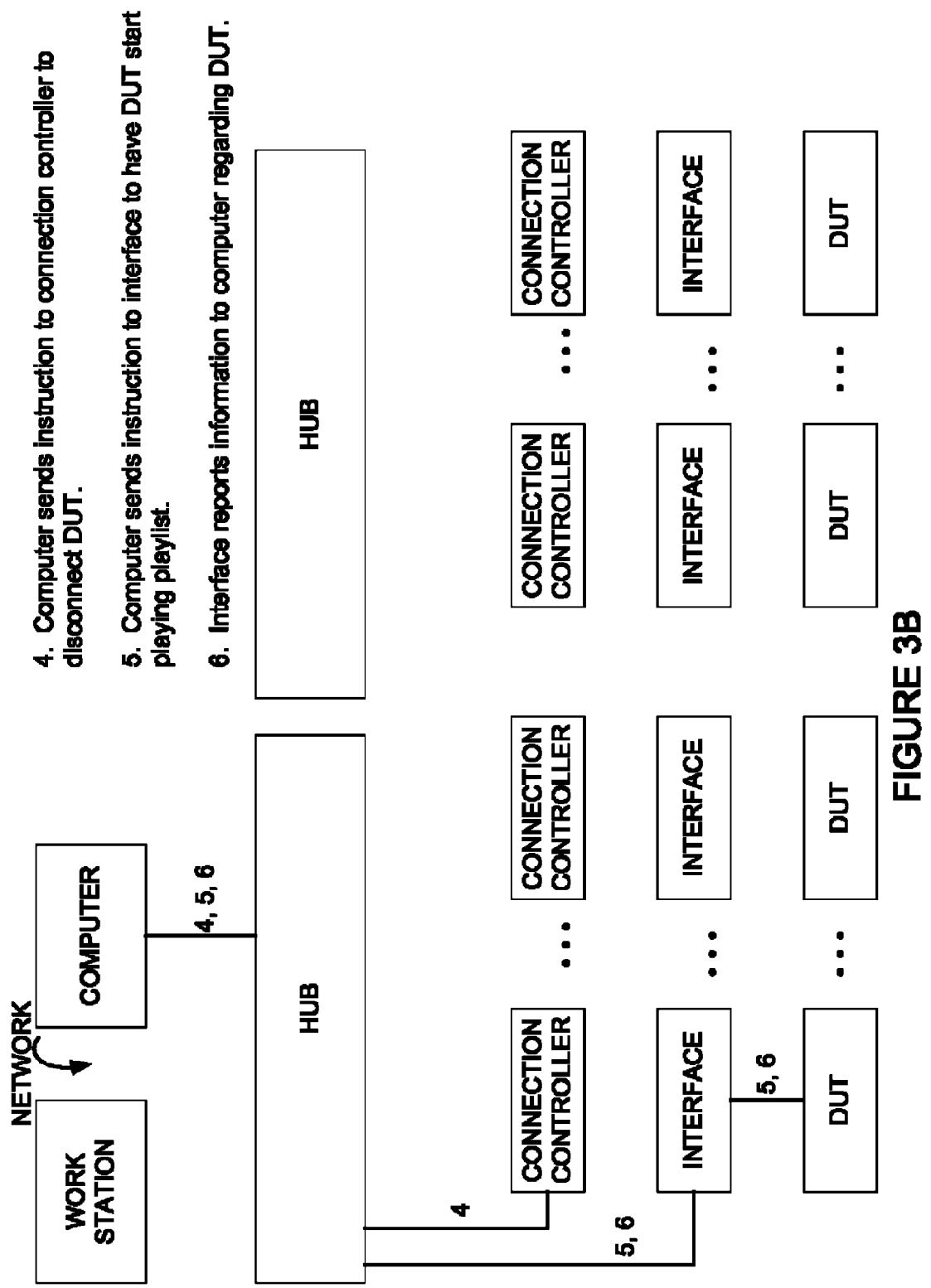

AUTOMATED PORTABLE MEDIA DEVICE TESTING SYSTEM

CROSS-REFERENCES TO RELATED APPLICATIONS

This application claims the benefit of U.S. provisional application No. 61/024,517, filed Jan. 29, 2008, titled "Automated Portable Media Device Testing System," which is incorporated by reference.

BACKGROUND

Media devices, or media players, have become extraordinarily popular the past few years. The number of models and the number of media players of each model produced is phenomenal. This rapid growth has stressed the testing capabilities of media player manufacturers. However, this testing needs to be performed to ensure that a media player operates in its intended manner for a user.

Media players are often connected to computers, docking stations, and other devices either directly or through a cable. These docking stations and cables are routinely connected and disconnected from these devices. Accordingly, it is desirable to test these media players by connecting and disconnecting them in a manner that models the real-world environment that they will be exposed to.

The most accurate way to model a user connecting and disconnecting a media player from a docking station or cable is to have a test operator perform that function in a test environment. However, this is an undesirable procedure for many reasons.

For example, the media player typically has one or more pins that make contact with one or more pins on a docking station or cable. These pins may become damaged during testing, thus lowering production yield. Also, some tests may be designed to measure time, for example, the length of time that a battery on the media player takes to charge to a specified level. If an operator manually connects a cable to start the charging process, the time to charge to the specified level cannot be accurately determined.

Also, updated software and firmware for previous and new models are regularly released. These releases are provided to users, typically over the Internet. Software that resides on a user's computer that is used on conjunction with a media player, for example to load media on the media player, is similarly updated. It is thus important to ensure that these updates do not cause problems for users once the updates are loaded on their media players.

Thus, it is desirable to be able to automate the process of connecting and disconnecting a media player during testing. It is also desirable to have a test system that can update software and firmware on a media player, and then test the updated media player. It is further desirable to have a test system that can update a test computer with new software as part of the testing procedure.

SUMMARY

Accordingly, embodiments of the present invention provide circuits, methods, and apparatus for testing media devices. An exemplary embodiment of the present invention provides a test system for testing a number of media players. The media players tested may be all the same type, or of different types. One or more computers control the testing of the media players and collect results. These one or more computers may be under the central control of a workstation or other computer. These computers may be updated with new software by the workstation or other computer.

In this exemplary embodiment, each computer may test a number of media players. The media players may be connected to the computer via direct connections, or they may be made via a hub or router. Some or all of these connections may be wired or wireless. Each media player tested may be connected to the computer via an adapter. This adapter may include a connection control circuit and an interface circuit.

The connection control circuit may be under the control of the computer. It may connect and disconnect a power supply to the media player being tested. In a specific embodiment of the present invention, the voltage waveform produced when the power supply is connected and disconnected is designed to mimic a voltage waveform produced when a user connects and disconnects a cable or docking station from a media player.

The interface circuit may also be under the control of a computer. The interface circuit may receive commands to provide specific instructions to the media player. The interface circuit may also monitor activities performed by, and the status of, the media player and report them back to the computer.

Tests performed by embodiments of the present invention may provide go/no-go results. That is, it may be determined whether or not a device is fully functional. Other test results may be in the form of a numeric value. This number may be stored both as a value and as an indication of whether the stored value is above or below a certain test threshold.

Testing performed by embodiments of the present invention may be conducted as part of a software or hardware debug procedure. Alternately, these tests may be performed as part of a manufacturing procedure. Also, these tests may be performed for other data gathering purposes, such as measuring parameters for a data sheet or other type of specification.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIGS. 3A-3B illustrate the transfer of data in a test system according to an embodiment of the present invention;

DESCRIPTION OF EXEMPLARY EMBODIMENTS

Figure 1:
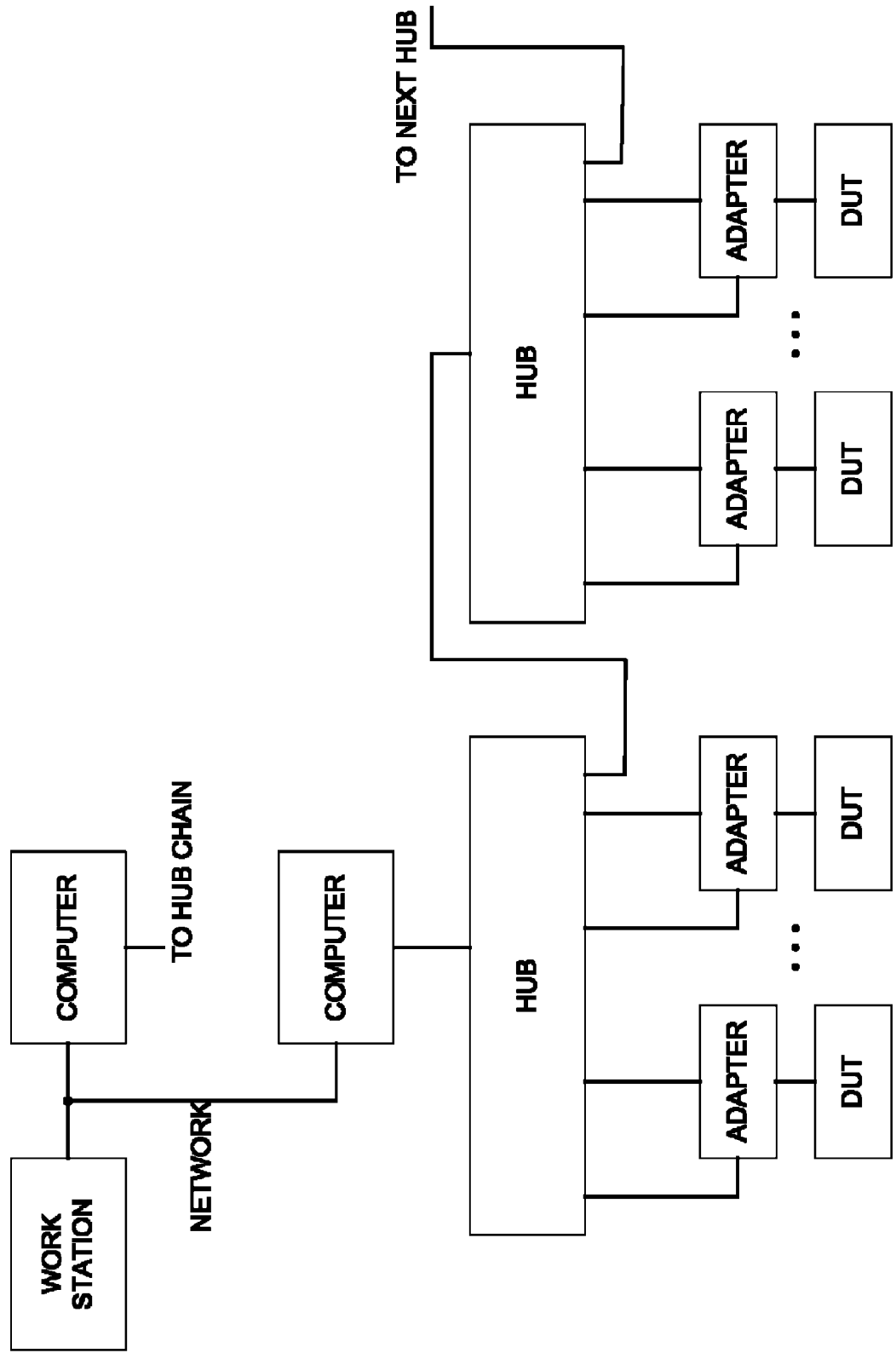
FIG. 1 illustrates a test system according to an embodiment of the present invention.

FIG. 1 illustrates a test system according to an embodiment of the present invention. This figure, as with the other included figures, is shown for illustrative purposes and does not limit either the possible embodiments of the present invention or the claims.

This figure includes a workstation in communication with one or more computers. In this example, the workstation communicates with one or more computers over a network. Each computer is in turn connected to one or more hubs. Each hub connected to a number of devices that are being tested. In this example, the devices being tested are connected to a hub through an adapter. In other embodiments of the present invention hubs are not used, although the number of devices that may be tested may be reduced.

The workstation may be automated, that is it may fully be under automatic control, or it may require some degree of user intervention. The workstation communicates with one or more computers via a network, such as a local-area network, wireless, or other type of network. The workstation may load or update software resident on one or more of the computers in the test system. For example, the workstation may write one or more programs, such as those developed by Apple Inc. of Cupertino, Calif., to the computers to be executed while the computers are communicating with one or more devices under test. These programs may be the same or similar to programs provided for home use and they may be updated or otherwise revised periodically. It is therefore desirable to verify the functionality of these program updates using this test system, and this may be accomplished by using the updated program during the testing of the devices. Accordingly, in various embodiments of the present invention, the workstation may update programs running on the various computers in the test system. In other embodiments of the present invention, program updates may be provided to the computers in other ways, such as by using other devices attached to the network, by using drives associated with the computers, or by other methods.

The computers and workstation may be computers such as those designed and manufactured by Apple Inc. The computers may load software and firmware on the devices under test, pass commands to the devices, monitor their activities, as well as perform other tasks. Again, each computer may control the testing of a number of devices through one or more groups of hubs.

These hubs may be USB, wireless, or other types of hubs. In a specific embodiment, seven port hubs are used, though hubs with other numbers of ports may be used in other embodiments of the present invention. The hubs may be connected in a daisy chain manner as shown, or they may be connected using another configuration, such as a star topology.

The adapters may transfer data between the computer and device under test using a first connection. The adapters may also communicate with the computer over a second connection. In various embodiments of the present invention, an adapter can provide commands to the device being tested, translate signals from one protocol to another, measure voltages at device pins, start and stop various applications, connect and disconnect power supplies, synchronize content on the device under test with content on the computer, and provide software and firmware updates from the computer to the device under test. In this example, each adapter is shown to be in communication with one device under test. In other embodiments, each adapter is in communication with a number of devices under test.

These devices under test may be portable media players, such as those designed and manufactured by Apple Inc. They may alternately be other handheld, portable or non-portable, communication, computing, or other types of electronic devices.

In the above example, an adapter is placed between the computer and each device under test. Again, the adapter may have at least two functions, to connect and disconnect the media player, and to provide commands, monitor, and report back to the computer. In other embodiments, separate circuits may perform these functions. An example is shown in the following figure.

Figure 2:
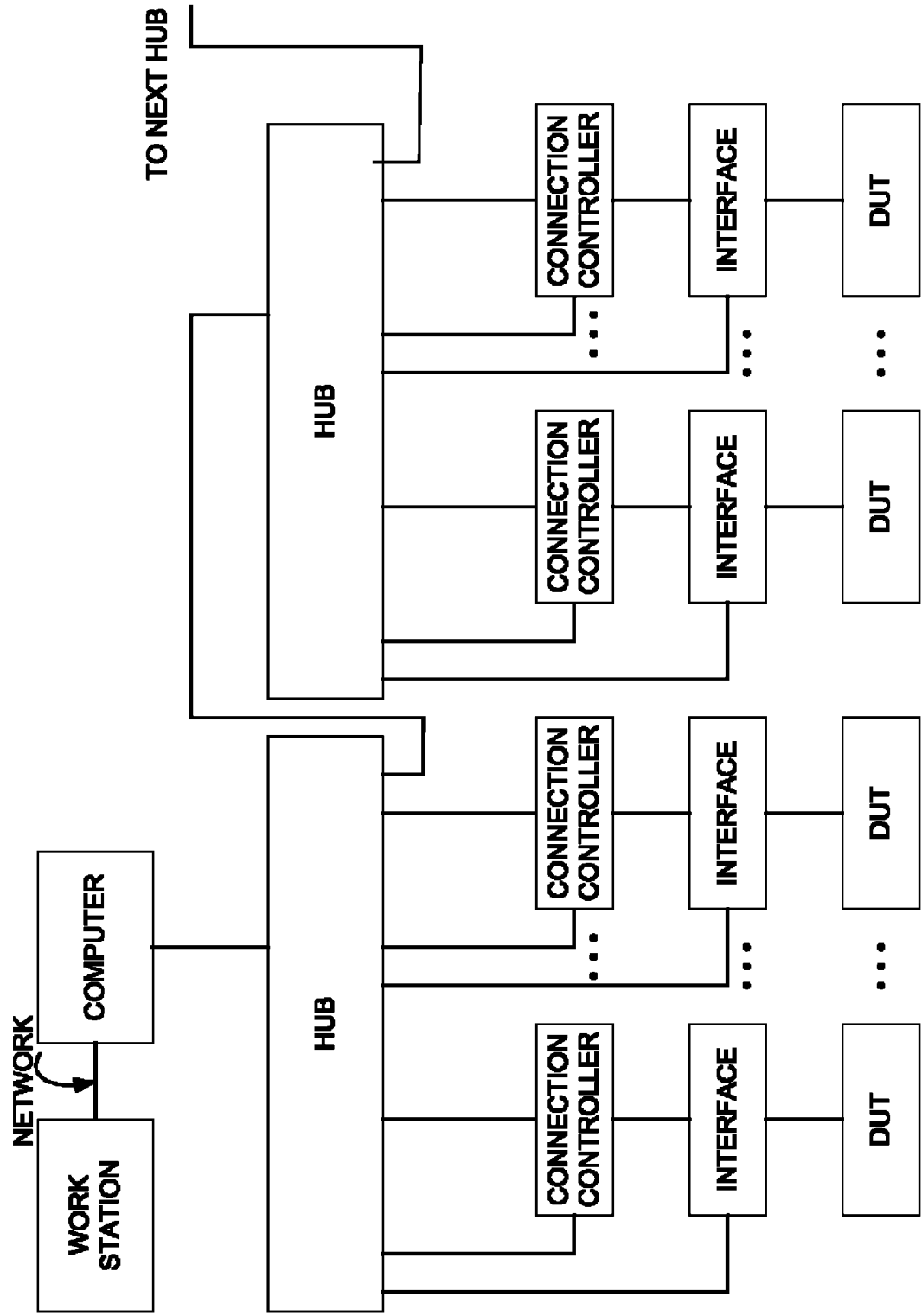
FIG. 2 illustrates another test system according to an embodiment of the present invention.

FIG. 2 illustrates another test system according to an embodiment of the present invention. In this figure, a workstation is shown communicating with only one computer for simplicity, though as above, other computers may also be in communication with the workstation. The workstation communicates with these one or more computers over a network such as a local area network, wireless network, or other type of network. The workstation may update software on these computers using the network. This software may then used to load firmware, software, and media on the devices under test, either alone or in conjunction with other software. Alternately, other computers or devices may update the software on the computers.

The computer is connected to a number of hubs arranged in a daisy chain configuration. Again, other topologies, such as a star topology, may be used. In this example, each hub is connected to one or more connection controllers. The connection controller can connect and disconnect the corresponding device under test. In a specific embodiment of the present invention, the hub is a USB hub and the connection controller connects and disconnects a USB power supply connection to the device under test. While in this embodiment, one connection controller circuit is shown for each media player, in other embodiments of the present invention, more than one media player may be connected or disconnected by one connection controller.

Signals are passed through the connection controller to an interface circuit. The interface circuit transfers data between the computer and the device under test via the hub. The interface circuit also has a connection back to the computer. The interface circuit uses this connection link to receive instructions from the computer and to provide data regarding the device under test to the computer. As with the connection controller, one interface circuit is shown for each media player, though in other embodiments of the present invention, more than one media player may be connected to an interface circuit.

The interface circuit can receive commands from the computer instructing it to provide commands to the device under test. The interface circuit can then provide those commands to the device under test. For some tests, instructions to give commands may be received in a different protocol than the protocol used for the command itself. In such a case, the interface circuit receives an instruction to provide a command in a first protocol and provides the command in a second protocol. These commands may be commands to start or stop applications, to receive or provide data, or they may be other commands.

The interface circuit may also pass data between the computer and the device under test. For example, the computer may provide software or firmware updates to the device under test. The software or firmware may be provided to the hub, which provides it through the connection controller to the interface circuit. The interface circuit then passes this data to the device under test, which is then updated. Various types of media, such as music and video playlists, may be provided to the devices under test as well.

In various embodiments of the present invention, the interface circuit may test voltages provided by the device under test and report results back to the computer. The interface may also check the timing of such signals.

Also, the interface, possibly in conjunction with the computer, may determine the validity of the format of data provided by the device under test. For example, it may check to determine whether data packets provided by the device under test are formatted correctly. In other embodiments of the present invention, the interface, again possibly in conjunction with the computer, may determine the validity of the sequence of data or other information provided by the device under test.

In a specific embodiment of the present invention, the hubs are USB hubs. Accordingly, USB cables can be used to connect the hub to the connection controller. Again, two cables can be used. In this specific example, the first cable carries information to be provided to the device under test. The second cable carries information indicating whether the connection controller should connect or disconnect the device under test. Another USB cable connects the connection controller to the interface circuit. In other embodiments of the present invention, one or more of these connections may be other types of wired or wireless connections.

The cable from the connection controller to the interface circuit carries the information intended for the device under test. Another cable connects the interface circuit back to the computer via the hub. This cable carries information for the interface circuit itself. Again, this information may include instructions to give the device under test a command or to monitor the device under test. The interface circuit reports back to the computer over this same connection.

The interface circuit may be connected directly to the device under test, or it may connect using a cable. If it connects directly to the device under test, it may use a connector such as the 30-pin connector described in copending U.S. patent application Ser. No. 10/423,490, titled Media Player System, which is hereby incorporated by reference. When a cable is used, it may have a USB connection on one end to plug into the interface circuit, and a connector such as the 30-pin connector described above on the other end to plug into the device under test.

In this particular example, the two connections for the connection controller, and the connection for the interface circuit, are shown as being connected to a single hub. In other embodiments of the present invention, more than one hub may be used. For example, one of the hubs may provide control signals to the connection controller that are intended for the device under test. A second hub may provide the signals that control the connection controller. Similarly, signals for the interface circuit may be provided by either one of these, or a third hub may provide them.

These different hubs may each be daisy chained, or have a star or other type of topology. Alternately, routers, repeaters, or direct connections may be used for some or all of these connections. One computer may connect to all hubs, or more than one computer may be used, where each computer is connected to one or more hubs.

In one example, a first computer is connected to a first hub. The first hub provides data to the device under test via a first connection to a connection controller and also provides the control signals to the connection controller via a second connection. A second computer is connected to a second hub. The second hub is in communication with the interface circuit. In this example, the first computer provides data and instructions to the device under test and the connection controller, while the second computer receives results back from the interface circuit. Using a second computer in this configuration may be desirable in the event that an error occurs in the first computer as it is providing data to the devices under test. If this occurs, data previously received from the interface circuit is not affected since it is stored on the second computer.

Some of the various activities of a test system such as the one illustrated in FIG. 2 are shown in the following figure.

Figure 3A:
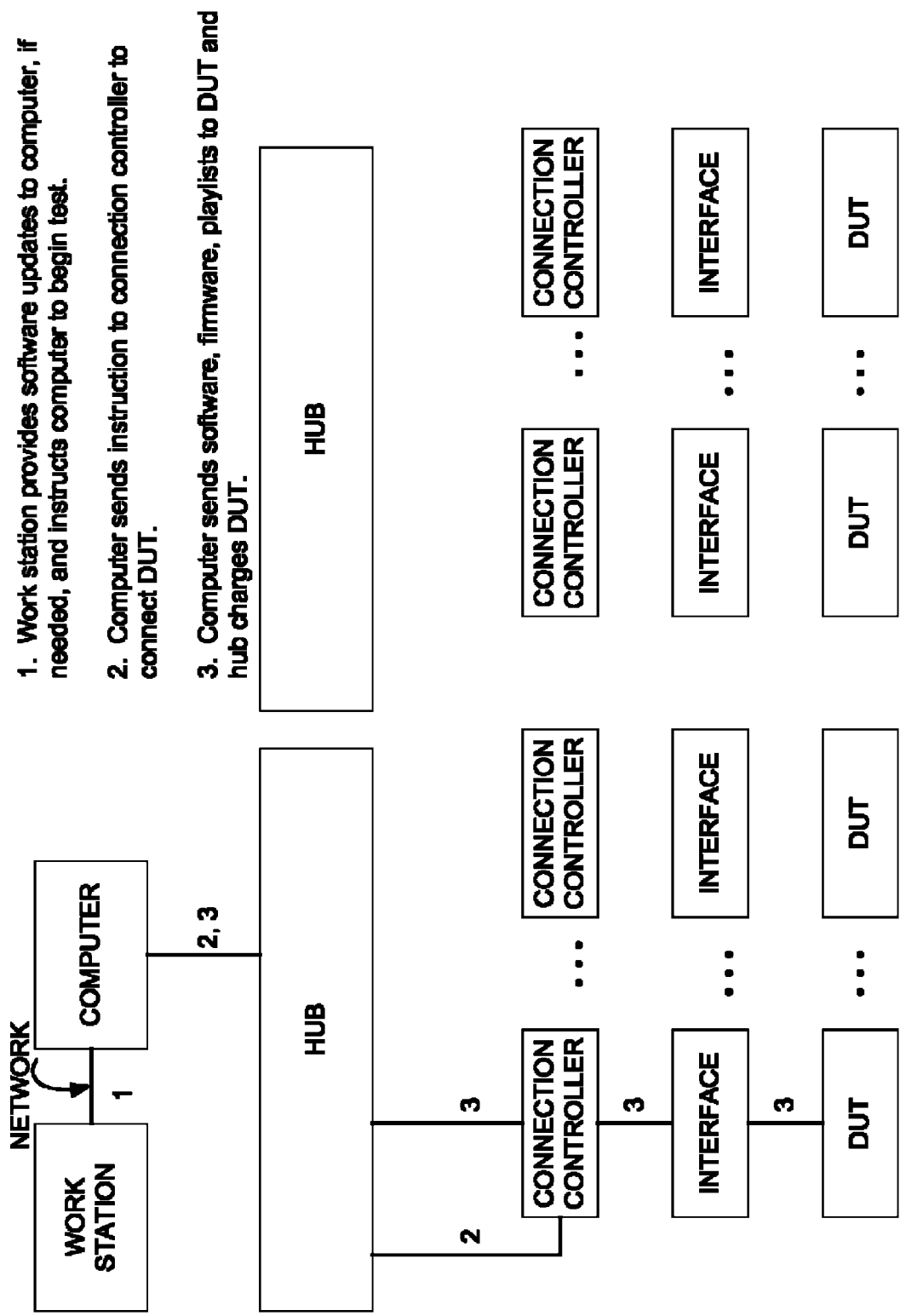

FIGS. 3A-3B illustrate the transfer of data in a test system according to an embodiment of the present invention. In these figures, a new software or firmware update is provided to the device under test. Media is then provided to the device under test. It is then determined whether the device under test is capable of correctly playing back media for a specified period of time.

Specifically, in FIG. 3A, the workstation, if appropriate, provides programs, updated programs, or program updates to one or more computers in the test system. Using updated programs during device testing allows the updated program to be tested by the test system. That is, if an error exists in the updated program, it may cause errors in one or more devices under test, and the error can be traced back to the program update for debugging purposes.

The workstation then instructs the computer to begin testing. The computer sends an instruction to the connection controller to connect the device under test. The computer then sends software, firmware, and playlists to the device under test. While this is occurring, the hub charges a battery on the device under test.

In FIG. 3B, the computer sends an instruction to the connection controller instructing it to disconnect the device under test. The computer then sends an instruction to the interface to have the device under test start playing the playlist. The interface reports information back to the computer regarding the device under test. For example, it may report that the device under test is properly playing back the playlists. It may also report back the status of the charge on the battery on the device under test.

In various embodiments of the present invention, each of these various acts may be performed on one, more than one, or all devices under test at a time. For example, devices may be connected or disconnected one at a time, several may be connected or disconnected at a time, or they all may be connected or disconnected at once. Also, firmware updates may be provided to each device under test one at a time, several at a time, or all at once. A flowchart illustrating the above procedure is shown in the following figure.

Figure 4:
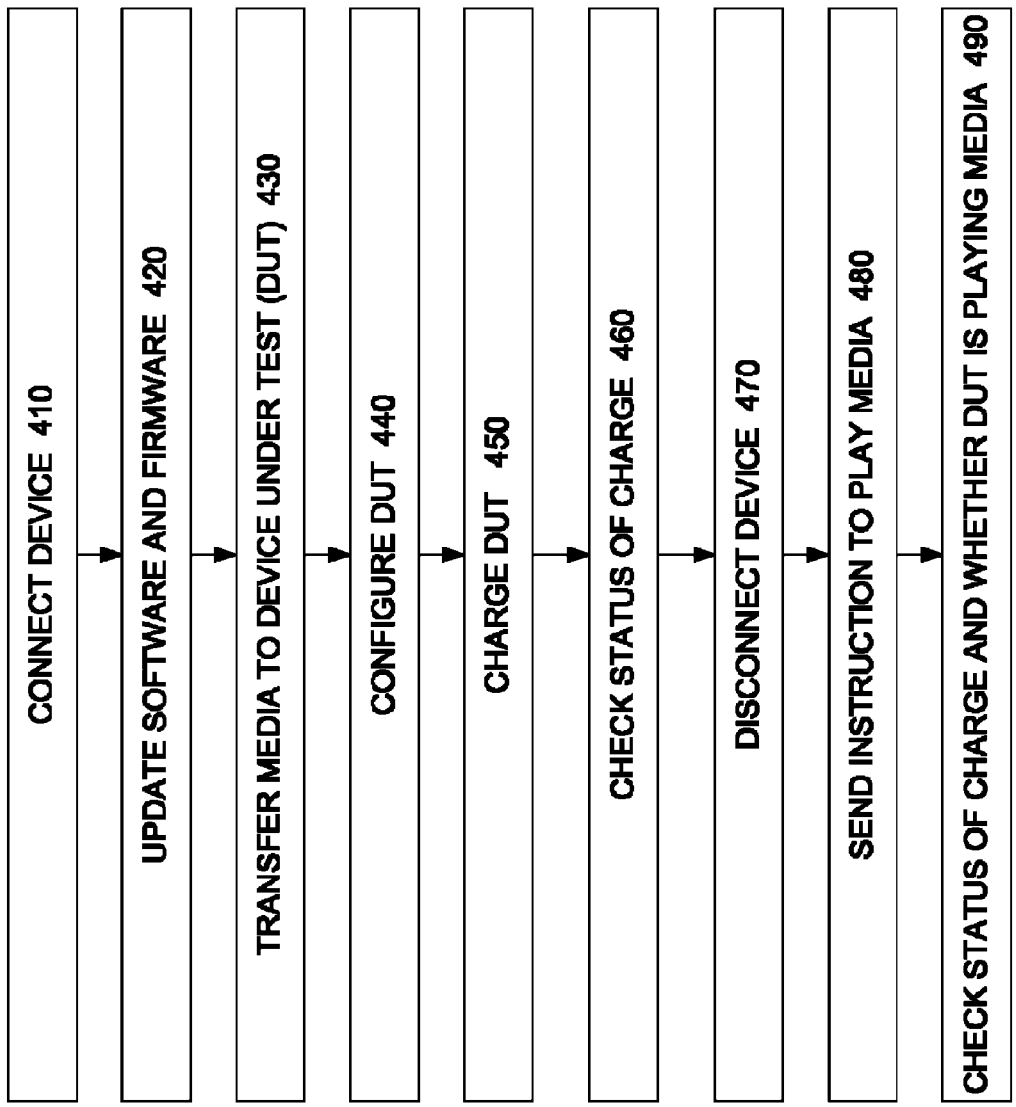
FIG. 4 is a flowchart illustrating the activities in FIGS. 3A-3B.

FIG. 4 is a flowchart illustrating the activities in FIGS. 3A and 3B. In this method, software or firmware and media are provided to device under test. Further configuration and charging of device is also performed. The device is disconnected and instructed to play the media. Tests including status checks of the charge on the battery and whether the device is playing media may then be performed.

Specifically, in act 410, the device is connected, for example to a hub or computer. Software or firmware for the device is transferred in act 420. Media, such as audio, video, text, or other media, are transferred to the device in act 430. In act 440, the device is configured for operation. In act 450, the device is charged. Typically, this charging can begin once the device is connected.

In act 470, the device is disconnected. An instruction to the device to play the media is provided in act 480. In act 490, status checks of the charge on the battery and whether the device is playing the media can be made. Other tests may also be performed at this time.

Again, many of these tests involve connecting and disconnecting a media player. However, it is undesirable to manually connect and disconnect a media player during testing. A media player typically has a connector having one or more pins that make contact with one or more pins on a tester. With manual insertion, pins may become damaged during testing, thus lowering production yield. Also, it may be difficult to determine the exact time an operator connects or disconnects a cable. If this data is needed for a test, the accuracy of the test may be compromised. Accordingly, embodiments of the present invention provide an electronic connection controller for connecting and disconnecting media players. An example is shown in the following figure.

Figure 5:
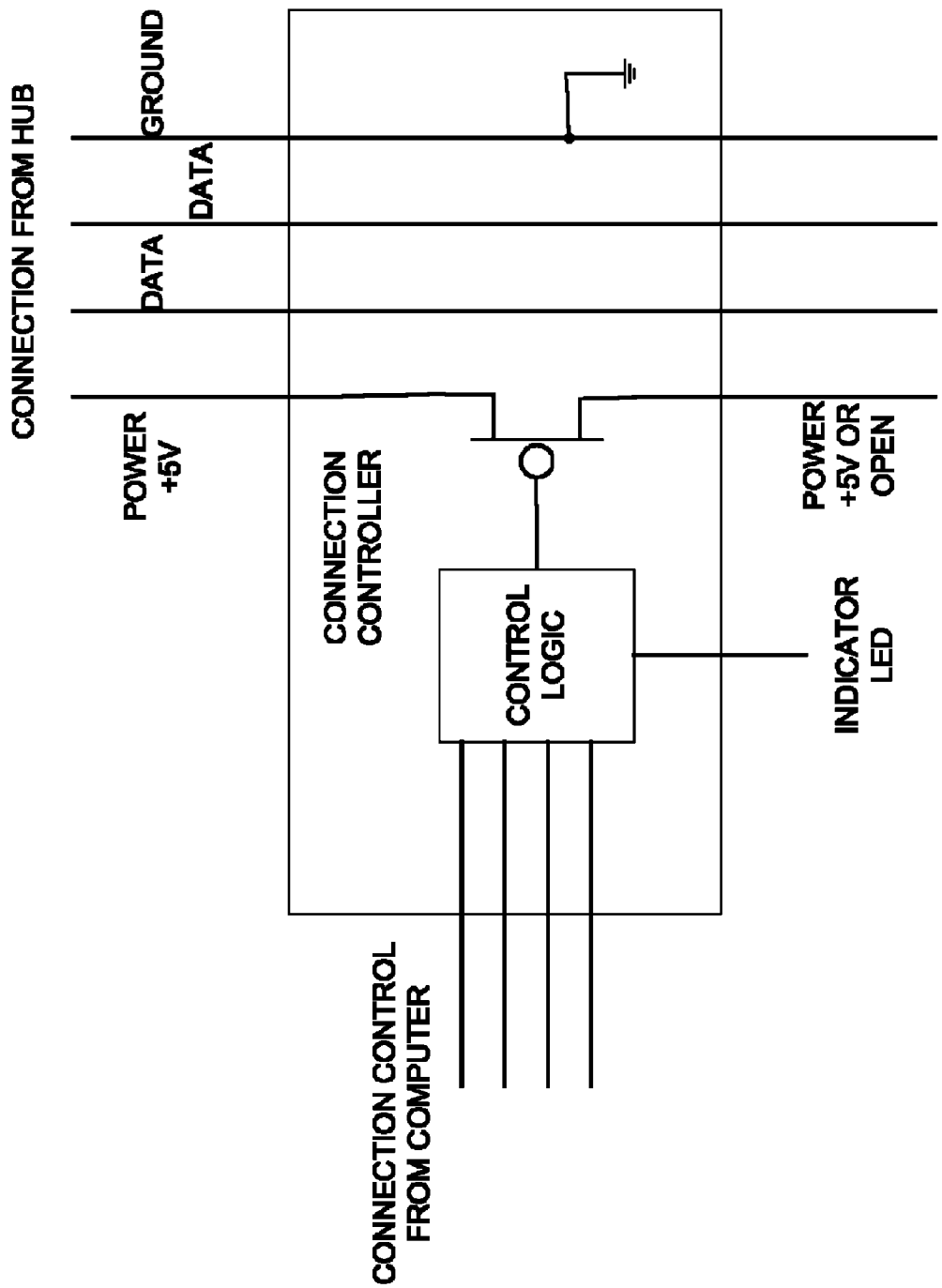
FIG. 5 is a simplified schematic of a connection controller according to an embodiment of the present invention.

FIG. 5 is a simplified schematic of a connection controller according to an embodiment of the present invention. The circuit includes three I/O ports. At the first port, control signals are received from a computer by control logic. A specific embodiment of the present invention employs a Delcom 882378, available from Delcom, Port Chester, N.Y., as the control logic, but other circuits may be employed by other embodiments of the present invention. The control logic controls a power MOSFET device, shown here in this example as a p-channel MOSFET device, though other types of devices may be used in other embodiments of the present invention. For example, a bipolar pnp device may be used.

The second I/O port is a connection from a hub. Power is received on the power supply line. The other lines include a ground and two data lines. The data lines are provided directly to the interface circuit on a third I/O port. These data lines may be twisted to improve noise performance. The ground may be directly connected, or a connection may be made through the ground of the connection controller circuit or case. When the power MOSFET device is conducting, the power received from the hub is passed to the interface circuit, and thus to the device under test. In this state, the device under test is connected. When the power MOSFET device is open, the power pin at the interface, and thus the power pin at the device under test, is open or at a high impedance, and the device under test is disconnected.

This example further includes an indicator or status LED. This LED may be lit when a connection to the media player is made. Alternately, the LED may be lit when the media player is disconnected. A specific embodiment of the present invention includes an LED having its anode connected to the collector of a pnp transistor and its cathode at ground, where the emitter of the pnp is tied to a positive power supply and its base is driven by the Delcom 882378 mentioned above.

In a specific embodiment of the present invention, it is desirable that the connection controller provides electrical characteristics and voltage waveforms at the power pin of the device under test similar to that of a human connecting or disconnecting the device under test to or from a cable or docking station. In one specific embodiment of the present invention, the MOSFET transistor is sized appropriately such that this is achieved. In other embodiments of the present invention, the control logic output waveform is adjusted such that this waveform, in conjunction with the power MOSFET device, electrically models the characteristics of a human disconnecting the device under test. A flowchart illustrating the use of this connection controller is shown in the following figure.

Figure 6:
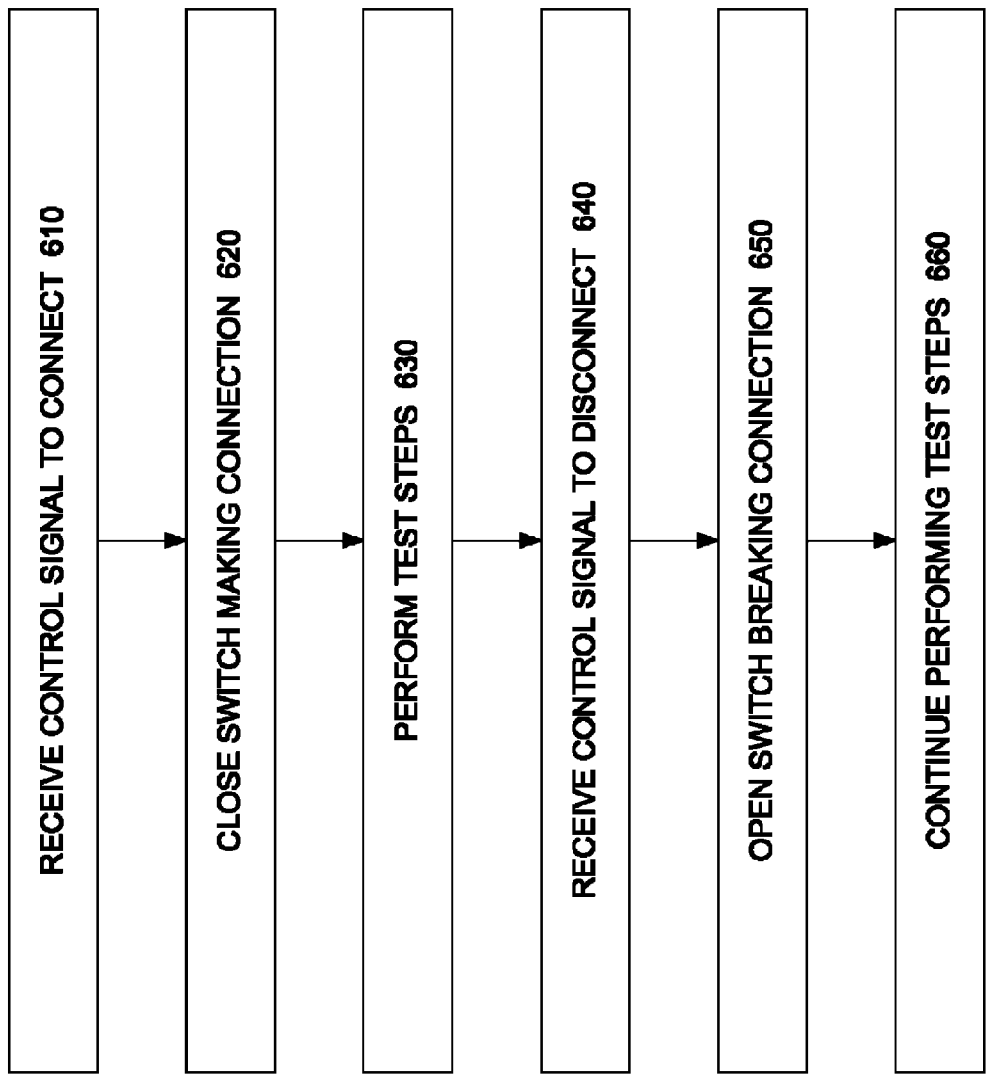
FIG. 6 is a flowchart illustrating a method of performing tests according to an embodiment of the present invention.

FIG. 6 is a flowchart illustrating a method of performing testing according to an embodiment of the present invention. In this method, a command or control signal instructing the device under test to be connected is received, the connection is made, and one or more tests are performed. A command or control signal to disconnect the device under test is then received. The causes the connection to be broken, after which one or more tests may be performed.

Specifically, in act 610, a control signal to connect a device under test is received. In act 620, a switch is closed, thereby making the connection. In act 630, one or more tests are performed. In act 640, a control signal to disconnect the device under test is received. Accordingly, in act 650, the switch it is opened, thereby breaking the connection. One or more tests may be performed in act 660. The specific connections used by an exemplary embodiment of the present invention are shown in the following figure.

Figure 7:
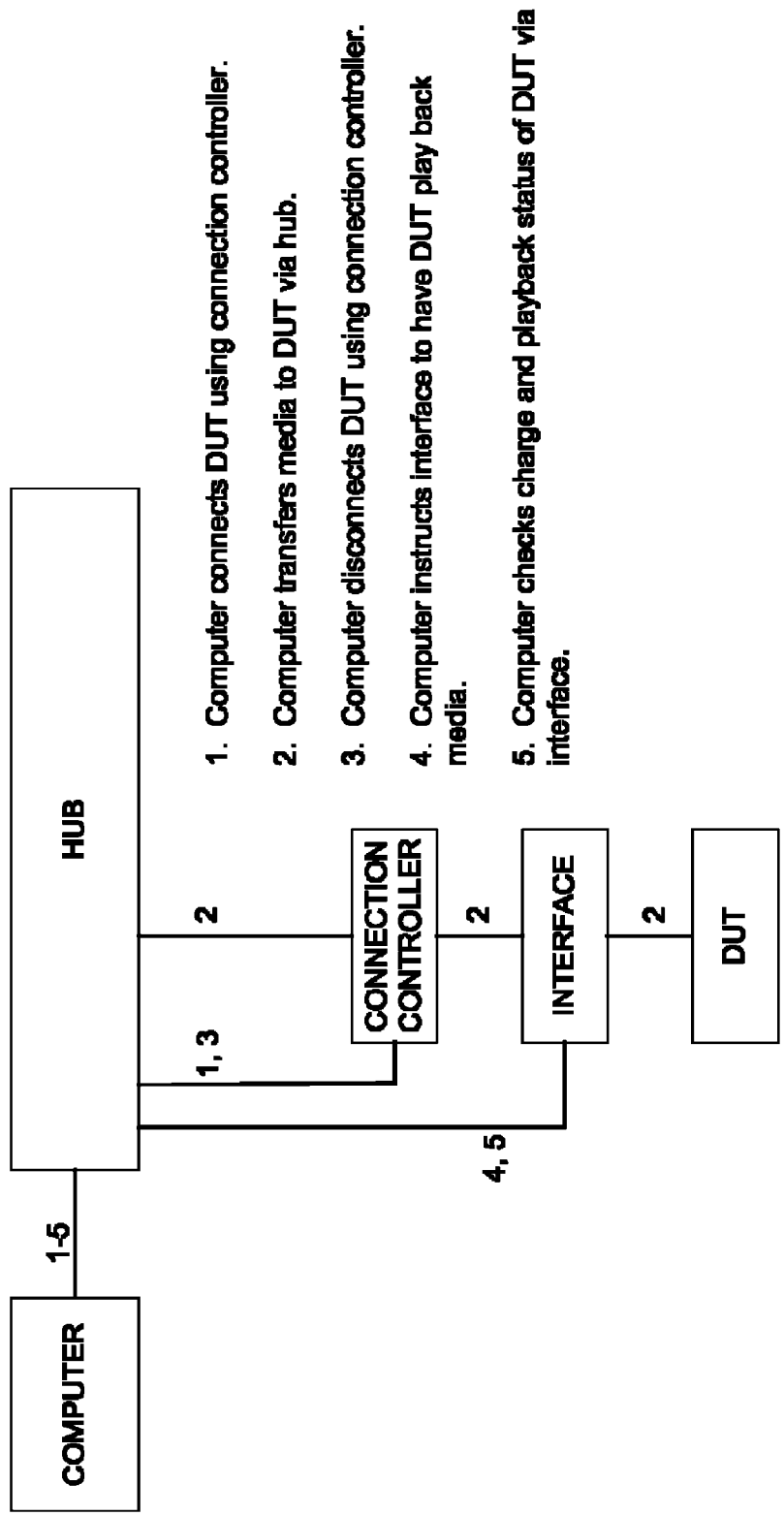
FIG. 7 illustrates the specific connections utilized during a method of testing a device according to an embodiment of the present invention.

FIG. 7 illustrates specific connections utilized during a method of testing a device according to an embodiment of the present invention. In this method, the computer can connect the device under test using a connection controller. The computer can then transfer media to the hub and disconnect the device. The computer can then have the device under test play back the media.

Specifically, the computer connects the device under test to the hub using the connection controller. The computer then transfers media to the device under test via the hub or other connection. The computer then disconnects the device under test, again using the connection controller. The computer then instructs the interface to have the device under test play back the media. The computer can poll or check the interface to see if the device under test is properly playing back the media.

In some embodiments of the present invention, it is desirable to test the quality of the media being played by a device under test. For example, it may be desirable to check the accuracy, power level, noise, or other characteristics of the output of the device under test. An example is shown in the following figure.

Figure 8:
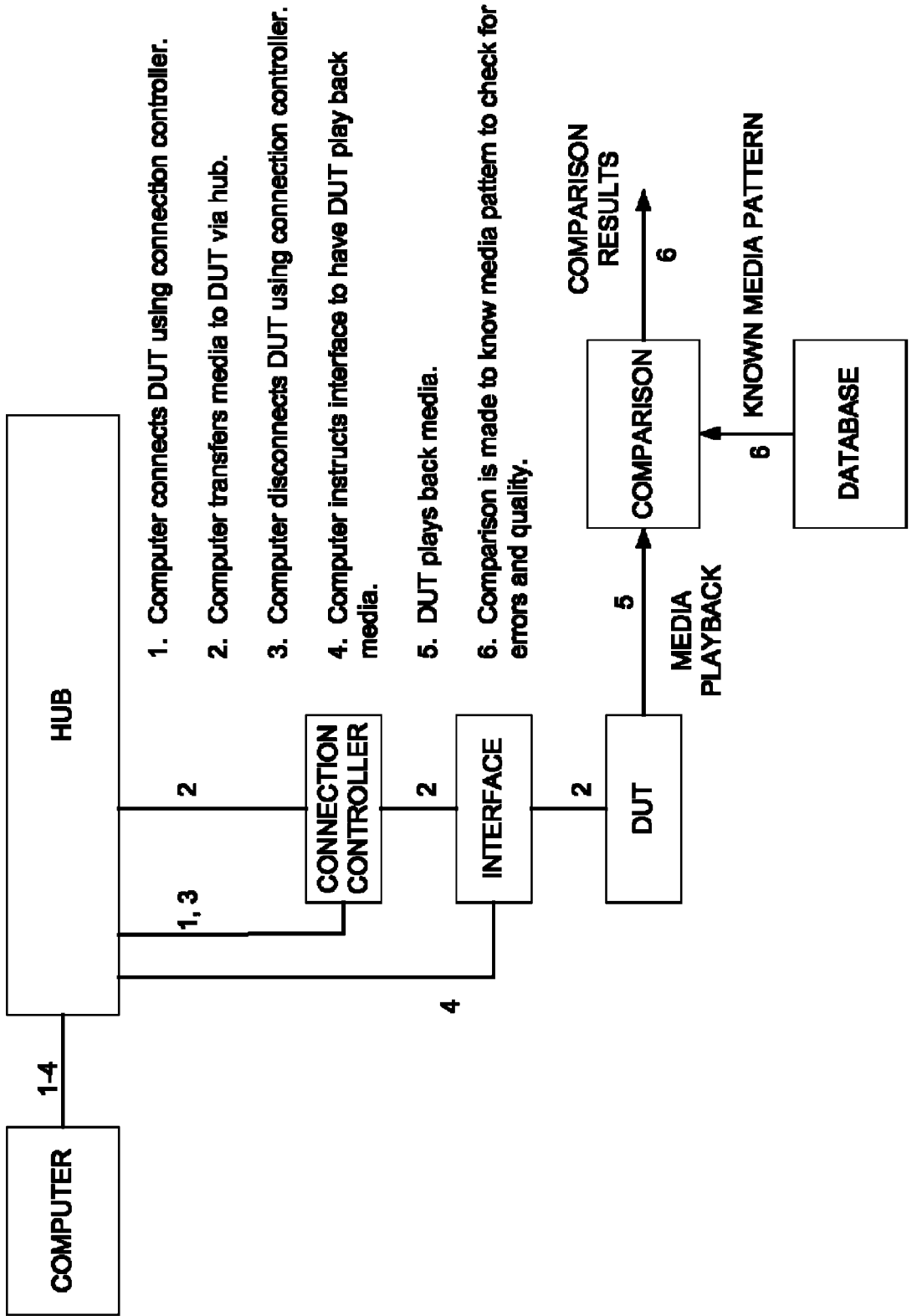
FIG. 8 illustrates a method of testing an output provided by a device under test according to an embodiment of the present invention.

FIG. 8 illustrates a method of testing an output provided by a device under test according to an embodiment of the present invention. In this method, the device under test plays back media to a comparison circuit. The comparison circuit compares the output to an expected "gold standard" waveform. The comparison results are then provided.

Specifically, as before, the computer connects the device under test using the connection controller. The computer transfers the media to the device under test via the hub or other connection. This media may typically include audio or video media. The computer disconnects the device under test using the connection controller. The computer then instructs the interface to have the device playback the media.

A comparison circuit then receives the media played by the device. The comparison circuit also retrieves a known or expected pattern from a database. The actual played media can be compared to this expected pattern, and the results may be compared.

While audio data and video data provided by a media player can be tested this way, on some media players, video images are also provided on the media player itself. Accordingly, it is desirable to be able to test the provided video image. An example of a method of testing such a video output according to an embodiment of the present invention is shown in the following figure.

Figure 9:
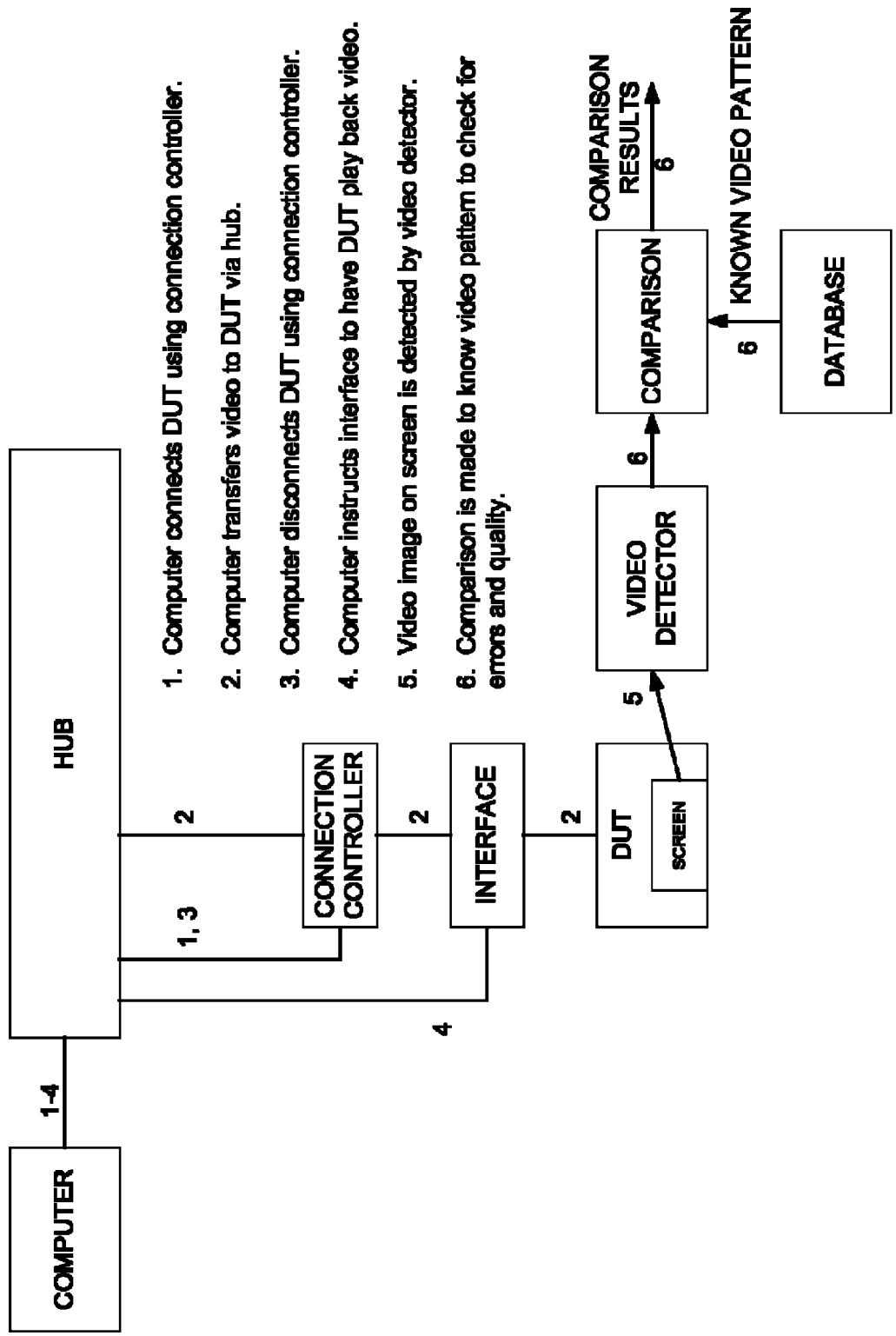
FIG. 9 illustrates a method of testing a video output provided by a device under test according to an embodiment of the present invention.

FIG. 9 illustrates a method of testing a video output provided by a device under test according to an embodiment of the present invention. In this method, a video detector views a screen on a device under test. The detector output can then be compared to an expected output.

Specifically, the computer can connect the device under test using the connection controller. The computer can then transfer video media to the device under test by using the hub or other connection. The computer can then disconnect the device under test using the connection controller once again.

The computer instructs the interface to have the device under test play back the video media. A video detector views the video image on the device's screen. The video detector in turn provides an output to a comparison circuit. The comparison circuit compares the detected video to an expected pattern stored in a database. Comparison results can then be provided.

In these tests, as with the other tests above, test results such as these comparisons may be in the form of go/no-go results. That is, in manufacturing, it is desirable to determine whether a device is fully functional, in which case it can be shipped, or not fully functional, in which case it may need to be repaired or discarded. For example, if a video test indicates that no video is detected on the screen of a media device, the test result is likely no-go. Other test results may be in the form of a numeric value. For example, the accuracy of a waveform provided by a device under test may be within a certain percent accuracy of an expected waveform. This accuracy may be reported both as a percentage and as an indication of whether the measured accuracy is above or below a certain test threshold value.

Further, these tests may be conducted as part of a software or hardware debug procedure. Alternately, these tests may be performed as part of a manufacturing procedure. Also, these tests may be performed for other data gathering purposes, such as measuring device parameters for a data sheet or other type of specification.

In various embodiment of the present invention, the devices under test may all be the same devices. Alternately, they may be different devices. For example, where a firmware update is going to be released to a number of different types of devices, each of the different types of devices can be provided with the firmware update and tested by an embodiment of the present invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A non-transitory computer-readable storage medium containing program instructions for simulating a process of disconnecting a power cable from a media player comprising: code for providing a signal to connect a power supply to the media player, the media player including a screen, and the power supply being the only source of power supplied to the media player and positioned external to the media player device; code for connecting the power supply to the media player; code for transferring data to the media player; code for providing a signal to disconnect the power supply from the media player; code for disconnecting the power supply from the media player, and code for subsequently providing an instruction to have the media player perform an operation when the power supply is disconnected; and code for receiving a signal indicating whether the media player performed the operation.

2. The computer program of claim 1 wherein the code for transferring data to the media player comprises code for transferring a firmware update to the media player.

3. The computer program of claim 1 wherein the code for transferring data to the media player comprises code for transferring a playlist comprising a plurality of songs to the media player.

4. The computer program of claim 3 wherein the operation comprises playing at least one of the plurality of songs of the playlist.

5. A circuit for simulating a process of disconnecting a power cable from a media player, a media player comprising: a first connector to receive and transmit signals and to receive a power supply; a second connector to receive and transmit the signals and to provide either the power supply or a high impedance; a switch coupled to receive the power supply from the first connector and provide either the power supply or the high impedance to the second connector; a third connector to receive a control signal, the control signal controlling whether the switch provides the power supply or the high impedance to the second connector; and a logic circuit to receive the control signal, wherein the switch comprises a MOS transistor and the logic circuit provides a signal to the gate of the MOS transistor; wherein the MOS transistor is sized such that when it switches from providing a power supply to providing a high-impedance, a resulting voltage waveform is similar to a voltage waveform resulting during a process of disconnecting a power cable from the media player.

6. The circuit of claim 5 wherein the logic circuit provides a signal to the switch.

7. The circuit of claim 5 wherein the MOS transistor is sized such that when it switches from providing a high-impedance to providing a power supply, a resulting voltage waveform is similar to a voltage waveform resulting during a process of connecting a power cable to the media player.

8. The circuit of claim 5 further comprising:
a light-emitting diode to indicate whether the switch is providing the power supply or the high impedance to the second connector.

9. The method of claim 5 wherein the signals comprise a firmware update.

10. The method of claim 5 wherein the signals comprise a playlist comprising a plurality of songs.

11. A method of simulating a process of disconnecting a power cable from a media player comprising: connecting the media player to a computer through a hub, a connection controller and an interface; passing media from the computer to the media player via the hub; disconnecting the media player from the computer via the connection controller, and instructing, by the computer, the interface to instruct the media player to play the media when the media player is disconnected from the computer; playing the media on the media player; comparing, by the computer, the playing media with an expected media; and determining the quality of the media based on the comparison.

12. The method of claim 11 wherein a port of the hub is a universal-serial-bus port.

13. The method of claim 11 wherein a port of the hub connects to a port of the connection control circuit via a universal-serial-bus cable.

14. The method of claim 11 wherein the connection controller is a circuit comprising a transistor coupled between a power pin of its first port and a power pin of its second port, the transistor controlled by logic controlled by one or more signals received at its control port.

15. The method of claim 11 wherein the expected media is provided by a database.

* * * * *

UNITED STATES PATENT AND TRADEMARK OFFICE
CERTIFICATE OF CORRECTION

PATENT NO.         : 8,775,113 B2                                  Page 1 of 1
APPLICATION NO.    : 12/238435
DATED              : July 8, 2014
INVENTOR(S)        : David M. Powers et al.

It is certified that error appears in the above-identified patent and that said Letters Patent is hereby corrected as shown below:

In the claims:

Column 9, Line 63, Claim 2: delete "computer program" and insert --non-transitory computer-readable storage medium--.

Column 10, Line 1, Claim 3: delete "computer program" and insert --non-transitory computer-readable storage medium--.

Column 10, Line 5, Claim 4: delete "computer program" and insert --non-transitory computer-readable storage medium--.

Column 10, Line 38, Claim 9: delete "method" and insert --circuit--.

Column 10, Line 40, Claim 10: delete "method" and insert --circuit--.

Column 10, Line 47, Claim 11: delete "and-" and insert --and--.

Signed and Sealed this
Thirtieth Day of September, 2014

Michelle K. Lee
*Deputy Director of the United States Patent and Trademark Office*